R. G. RANDALL.
METHOD OF AND APPARATUS FOR MIXING CONCRETE.
APPLICATION FILED NOV. 15, 1916.
1,312,207.   Patented Aug. 5, 1919.
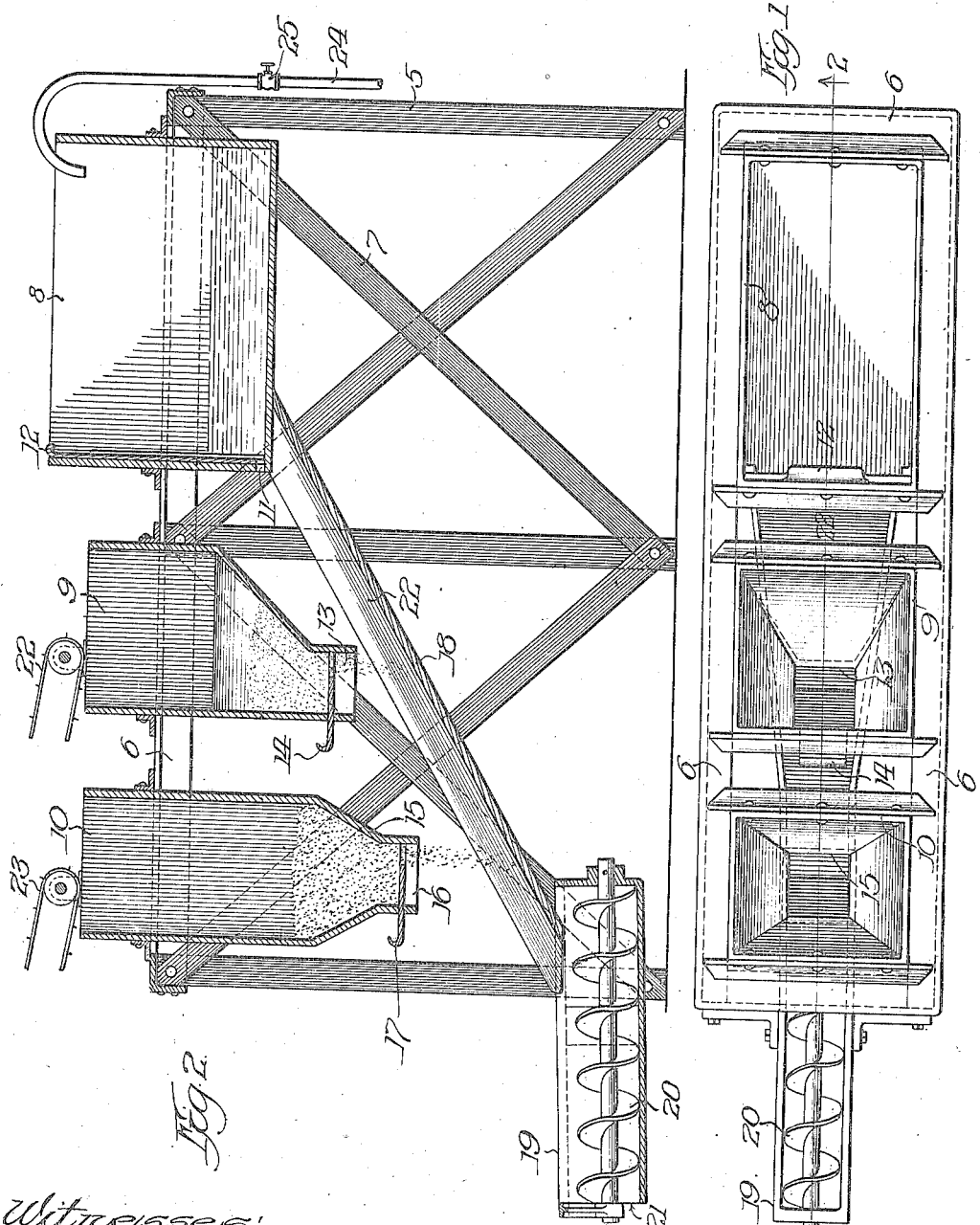

UNITED STATES PATENT OFFICE.

RAYMOND G. RANDALL, OF GRINNELL, IOWA, ASSIGNOR OF ONE-FOURTH TO EUGENE F. WOLCOTT AND ONE-FOURTH TO CHARLES WOLCOTT, BOTH OF GRINNELL, IOWA.

METHOD OF AND APPARATUS FOR MIXING CONCRETE.

1,312,207.   Specification of Letters Patent.   Patented Aug. 5, 1919.

Application filed November 15, 1916. Serial No. 131,382.

*To all whom it may concern:*

Be it known that I, RAYMOND G. RANDALL, a citizen of the United States, residing at Grinnell, county of Poweshiek, and State of Iowa, have invented certain new and useful Improvements in Methods of and Apparatus for Mixing Concrete, of which the following is a specification.

This invention relates to the mixing of pulverulent material and granular material with a liquid, and has for its object to obtain a thoroughly satisfactory mixture with a minimum expenditure of power and manual labor.

It is a further object of the invention to provide for the continuous mixing of the materials, as distinguished from the ordinary intermittent mixing and discharging, whereby a continuous stream of the mixture may be produced and immediately conducted to a place of use or stored for subsequent use.

While the invention relates generally to the mixing of pulverulent material and granular material with a liquid, it is specifically designed for the mixing of concrete.

In carrying out the present invention, pulverulent material and granular material, in the order named, are fed to the surface of a moving body of liquid, whereby the materials are thoroughly intermingled, and in the instance of the use of water, cement and sand a thoroughly satisfactory commercial concrete is produced.

A satisfactory form of apparatus for carrying out the present invention has been shown in the accompanying drawing; wherein—

Figure 1 is a plan view of a mixing apparatus embodying the features of the present invention.

Fig. 2 is a vertical sectional view of the line 2—2 of Fig. 1.

For the purpose of feeding or conveying the liquid, the present apparatus includes a conveyer 22 preferably in the form of a chute inclined to the vertical and supported by a suitable framework such for instance as the uprights 5, upper horizontal members 6 and diagonals 7.

At the upper end of the chute there is a tank 8 to contain water. This tank is provided with an outlet 11 controlled by a suitable valve 12. Water is supplied to the tank through a supply pipe 24 having a valve 25. In front of the tank 8 and above the chute 22 is a hopper 9 having an outlet 13 disposed to discharge into the chute and provided with a controlling valve 14. In front of the hopper 9 and above the chute is another hopper 10 having an outlet 16 disposed to discharge into the chute at a point below the discharge of the hopper 9 and provided with a suitable controlling valve 17. Suitable conveyers 23 and 23' are employed for feeding material to the respective hoppers 9 and 10.

Communicating with the lower discharge end of the chute or conveyer 22 is a storage tank 19 having a terminal outlet 21 and provided with a spiral conveyer 20 designed to cause the mixture to travel through the storage tank 19 and be discharged through the opening 21. Incidentally the spiral conveyer 20 causes a further mixing of the mixture after it has been stored in the tank 19 and is being discharged therefrom.

In practice, water being supplied to the tank 8, cement to the hopper 9 and sand, gravel or the like to the hopper 10, the valve 12 of the water tank 8 is opened so as to permit of the discharge of water from the tank onto the conveyer or chute 22 in such a manner as to form a flowing film or shallow stream of water. The valve 14 is then opened so as to discharge cement to the surface of the flowing stream of water, and then the valve 17 is opened so as to discharge sand, gravel or the like to that portion of the surface of the water which is carrying the cement whereby the materials will be thoroughly intermingled and a commercial concrete will be made. This mixture or concrete may be conducted directly from the discharge end of the chute or conveyer to a place of use without requiring any further mixing or intermingling of the materials, or the material may be fed into a storage tank 19 and held therein for subsequent use.

Having thus described the invention what is claimed is:

1. The herein described method of mixing which consists in utilizing a film-like stream of liquid, and discharging thereon pulverulent material and granular material in the order named.

2. The herein described method of mixing which consists in employing a flowing stream of liquid and discharging thereon a predetermined amount of pulverulent material, and onto the water and pulverulent material a predetermined amount of granular material.

3. The method of making concrete which consists in discharging cement and sand in the order named to the surface of a flowing stream of water.

4. A mixing apparatus consisting of means for feeding and conveying a flowing body of liquid, and separate means above said conveying means for successively feeding pulverulent material and granular material in the path of movement of said body of flowing liquid.

5. A mixing apparatus comprising a chute, means for feeding liquid to an upper portion of the chute to form a flowing stream of liquid in the chute, means including a hopper for feeding pulverulent material to said chute and onto the upper surface of the flowing stream of liquid, and other means including a hopper for feeding granular material to said chute and onto that portion of the surface of the stream of liquid having the pulverulent material thereon.

Signed at Chicago, State of Illinois, United States of America, this 11th day of November, A. D. 1916.

RAYMOND G. RANDALL.

Witnesses:
  EUGENE F. WOLCOTT,
  E. O. McNAIR, Jr.